(12) United States Patent
Mikal et al.

(10) Patent No.: US 6,687,652 B2
(45) Date of Patent: Feb. 3, 2004

(54) DIAGNOSTIC CLEARING HOUSE

(75) Inventors: Philip J. Mikal, Cupertino, CA (US); Mou-Sheng Cheng, Fremont, CA (US); Stephen YiPing Chou, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 295 days.

(21) Appl. No.: 09/814,894

(22) Filed: Mar. 22, 2001

(65) Prior Publication Data

US 2002/0138234 A1 Sep. 26, 2002

(51) Int. Cl.[7] .................. G06F 11/30; G06F 15/00; G21C 17/00
(52) U.S. Cl. ................ 702/183; 702/180; 701/29; 705/400
(58) Field of Search .................. 702/183; 701/29; 705/400

(56) References Cited

U.S. PATENT DOCUMENTS 6,263,322 B1 * 7/2001 Kirkevold et al. .......... 705/400
6,487,479 B1 * 11/2002 Nelson ........................ 701/29

* cited by examiner

Primary Examiner—John Barlow
Assistant Examiner—Aditya Bhat
(74) Attorney, Agent, or Firm—Rosenthal & Osha L.L.P.

(57) ABSTRACT

A diagnostic clearing house comprises a tool repository to store a plurality of diagnostic tools. A communication vehicle allows a plurality of diagnostic tool users to exchange diagnostic information. A management system manages access to and content of the tool repository and the communication vehicle and manages distribution of diagnostic tools from the tool repository to an end user. The diagnostic clearing house may be web-based.

22 Claims, 6 Drawing Sheets

DCH Administration

Please choose an action from the left.

Here are the admin options:

Items
- View admin pending
- View owner pending
- View Pending Owner
- Confirmation
- Edit Item
- Delete Item
- Associate Related
- Add to 'Our Picks'
- Delete from 'Our Picks'
- View Techwriter Needed
- Submit New Item

Users
- View access requests
- Manage Approved Users
- Add New User

News
- Add new story
- Delete story

Functional Category
- Add a functional category
- Remove a functional category

Platform
- Add a platform
- Remove a Platform

OS
- Add an OS
- Remove an OS

FAQ
- Add to the FAQ
- Remove from the FAQ

Go to the main page

Go to the RT

FIGURE 4 ns (22), printers (26), etc.) and other resources is possible.

DIAGNOSTIC CLEARING HOUSE

FIELD OF THE INVENTION

The invention relates to web-based software and hardware diagnostic tools for testing the performance and reliability of different levels of hardware components designed for various platforms and functions.

BACKGROUND OF INVENTION

The development cycle for computer hardware components by leading manufacturers of computer equipment is relatively straight-forward. Referring to FIG. 1, the cycle begins with a concept phase (step 10), typically where an idea is generated by an engineer or other employee regarding a new product or an improvement to an existing product. The concept is then formalized in a design phase (step 12) where the practicality and the applicability of the idea is evaluated resulting in a set of designs of the idea ready to implement into a prototype. An implementation phase (step 14) uses the designs to manufacture the prototype of the hardware component in a form that can be tested. A testing phase (step 16) requires the use of diagnostic tools and equipment to determine if problems exist with the prototype. Returning to the design phase (step 12) of the cycle is required when a problem is found with the design in order to resolve the problem. If the error in the prototype is due to a manufacturing defect, returning to the implementation phase (step 14) of the cycle is required. The looping from the test phase (step 16) to the design (step 12) or implementation phase (step 14) of the cycle continues until all problems are resolved. Once no problems are detected, the hardware component enters the distribution phase (step 18) of the cycle.

As is demonstrated in the description of the development cycle a substantial portion of the development cycle is spent in the testing phase (step 16). As a result, individuals that test hardware components ("testers") are continuously looking for ways to work as efficiently as possible. In this environment, testers rely heavily on computerized diagnostic tools to test hardware components. Diagnostic tools allow a tester to test a large number of components in a short time and in an accurate manner. The diagnostic tools are developed for testing hardware components and numerous functions of the hardware components (e.g. cache, Central Processing Unit (CPU), Floating Point Unit (FPU), Input Output (I/O) devices, interrupt, mass storage, memory, graphics cards, etc.) for many different platforms.

With the rapid change of technology, these diagnostic tools are continuously being created, updated and modified at a very rapid pace in order to handle new functions and platforms. Testers often suggest the need for new diagnostic tools and occasionally create the diagnostic tool they use to test. Sharing diagnostic tools among testers is commonly accepted and encouraged. The result is an environment where the quality, support, and sharing of the tools varies greatly. To locate a specific diagnostic tool to test a particular component or function, a tester searches source code or asks around a testing group for potential contacts within the company that may be familiar with the diagnostic tool.

Referring to FIG. 2, a desktop computer (20) today is often part of a larger network of computers connected to via a network as a client to a central server (28). As a result of the client being connected to the central server (28), access to various programs, files, peripheral equipment (e.g. scanners (22), printers (26), etc.) and other resources is possible. The central server (28) also acts as a communications buffer for the client on the network. E-mail is stored and distributed from the central server (28) and access to the Internet and the world wide web is provided.

As the popularity of the Internet has increased, business entities of all sizes are using Internet technology to communicate with and provide information to employees. Typically, an employee is able to log onto a company-controlled web site at his or her own networked desktop computer (20). Instead of posting information in a break room or sending around memoranda, valuable and current information about the business entity and resources that allow an employee to be more efficient is stored on the web site. Examples of resources include a collection of commonly used forms, a bulletin board where common problems can be posted with solutions, a suggestion box for innovative ideas, a list of commonly used programs, and a listing of best practices and policies of the business entity. The result is a central place for employees to gather, exchange, and discuss information to help the employee improve personal efficiency and corporate productivity.

SUMMARY OF INVENTION

In one aspect, a diagnostic clearing house includes a tool repository to store a plurality of diagnostic tools, a communication vehicle to allow a plurality of diagnostic tool users to exchange diagnostic information, and a management system to manage access to and content of the tool repository and the communication vehicle and to manage distribution of diagnostic tools from the tool repository to an end user. In an embodiment, the diagnostic clearing house is web-based. In an embodiment, the plurality of diagnostic tools includes a diagnostic tool designed for testing computer hardware components. In an embodiment the tool repository is a relational database. In an embodiment, the distribution of diagnostic tools is by computer download. In an embodiment, the diagnostic information includes reviews of diagnostic tools, suggestions of additional classification categories, and electronic bulletin board discussions.

In another aspect, a method of using a diagnostic clearing house includes locating a diagnostic tool by searching a tool repository. The diagnostic tool is distributed to a user from the tool repository that in an embodiment is a relational database. Diagnostic information concerning the diagnostic tool is exchanged between a plurality of users. In an embodiment, the diagnostic tool is submitted to the tool repository. In an embodiment, the diagnostic clearing house is web-based. In an embodiment, the diagnostic tool is designed for testing computer hardware components. In an embodiment, the diagnostic tool is distributed by computer download.

In another aspect, a method of submitting and posting a diagnostic tool in a diagnostic clearing house includes submitting the diagnostic tool by the tool owner to the diagnostic clearing house. The diagnostic tool is added to a pending queue. An administrator removes the diagnostic tool from the pending queue and sends the diagnostic tool to a diagnostic reviewer. Once the diagnostic tool is approved by the diagnostic reviewer, the diagnostic tool is assigned a unique id and the diagnostic tool is stored in a tool repository based on the unique id. The diagnostic tool is classified and the diagnostic tool is associated by links with related diagnostic tools in the tool repository. Next, the diagnostic tool is posted on the diagnostic clearing house. In an embodiment, a review flag is set as true. In an embodiment, the diagnostic clearing house is web-based. In an embodiment, the diagnostic tool is designed for testing computer hardware components. In an embodiment, the tool repository comprises a relational database.

In another aspect, a method of exchanging diagnostic information between a plurality of diagnostic tool users in a diagnostic clearing house includes adding diagnostic information from a diagnostic tool user to a pending queue. Then the diagnostic reviewer. The diagnostic information is approved by the diagnostic reviewer and the diagnostic information is posted on the diagnostic clearing house that, in an embodiment is web-based.

In another aspect, a computer system for a diagnostic clearing house includes a storage element including a relational database. A plurality of diagnostic tools is stored in the relational database. A processor distributes a plurality of diagnostic tools from the relational database in the storage element. A communication vehicle stored in the relational database in the storage element allows a plurality of users to exchange diagnostic information. In an embodiment, a computer monitor is adapted to display the diagnostic clearing house. In an embodiment, the diagnostic clearing house is web-based. In an embodiment, the diagnostic tool is designed for testing computer hardware components.

In another aspect, a diagnostic clearing house includes a means for accessing a diagnostic tool by searching a tool repository, a means for distributing the diagnostic tool to a user from the tool repository, a means for exchanging diagnostic information between a plurality of users a means for submitting the diagnostic tool to the tool repository, and a means for posting the diagnostic tool on the diagnostic clearing house.

Other aspects and advantages of the invention will be apparent from the following description and the appended claims.

BRIEF DESCRIPTION OF DRAWINGS

FIG. 4 illustrates a computer screen shot of Diagnostic Clearing House detailing the administration section in one embodiment of the invention.

DETAILED DESCRIPTION

A Diagnostic Clearing House ("DCH") is a method and system for storing, searching, categorizing, reviewing, and distributing diagnostic software test tools ("diagnostic tools") for testing computer hardware components. In one embodiment of the invention, the DCH is web-based and the diagnostic tools are distributed via a computer download. Quality diagnostic tools provide a logical and easy method to locate hardware faults and an ability to isolate a root cause of the hardware fault in a rapid manner. Such benefits can shorten the development cycle, reduce the time before the product enters the market, maintain high availability and support system uptime. The DCH is a "one-stop shopping center" for the diagnostic testing community providing information regarding all available diagnostic tools. In addition to providing electronic distribution of these tools, the DCH provides a communication vehicle to keep testers and tool owners informed of the latest diagnostic and product news, design roadmaps, diagnostic tools, and activities.

The DCH can logically be broken into three distinct sections. First, a tool distribution section contains the features that categorize, search, display, review, track, and distribute diagnostic tools. Second, a communication vehicle section contains features that provide information to a DCH user (both testers and tool developers) and allow the DCH user to provide information to the DCH, such as bulletin board discussions, Frequently Asked Questions (FAQs) and relevant news. Third, an administration section contains features to manage the submission and posting of diagnostic tools, to manage user access, and to manage the content of the DCH.

The heart of the DCH is the tool distribution section that provides for the automation of the submission and access of diagnostic tools. The DCH provides a central and easy way to manage and distribute diagnostic tools thereby shortening the development cycle. The process starts by a diagnostic tool being submitted by a diagnostic tool developer ("tool owner"). The submission is then reviewed by a Diagnostic Reviewer (the DCH administrator or a designee of the DCH Administrator) to determine the quality, viability, and applicability of the diagnostic tool. If approved, the diagnostic tool is posted onto the DCH. The detailed steps required to post the diagnostic tool is described in the administration section below.

Figure 1:
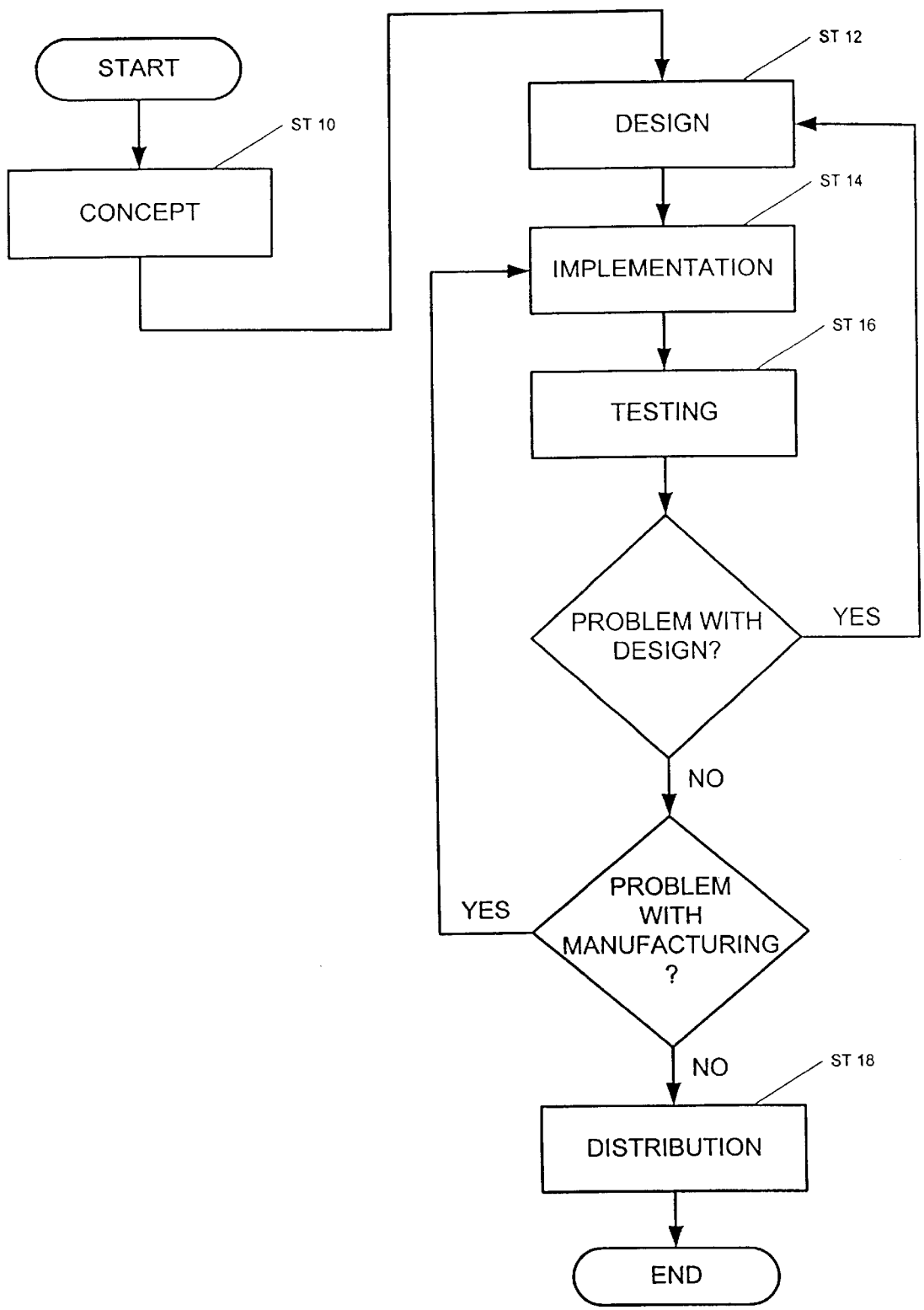
FIG. 1 illustrates a flowchart of a hardware development cycle.
Figure 2:
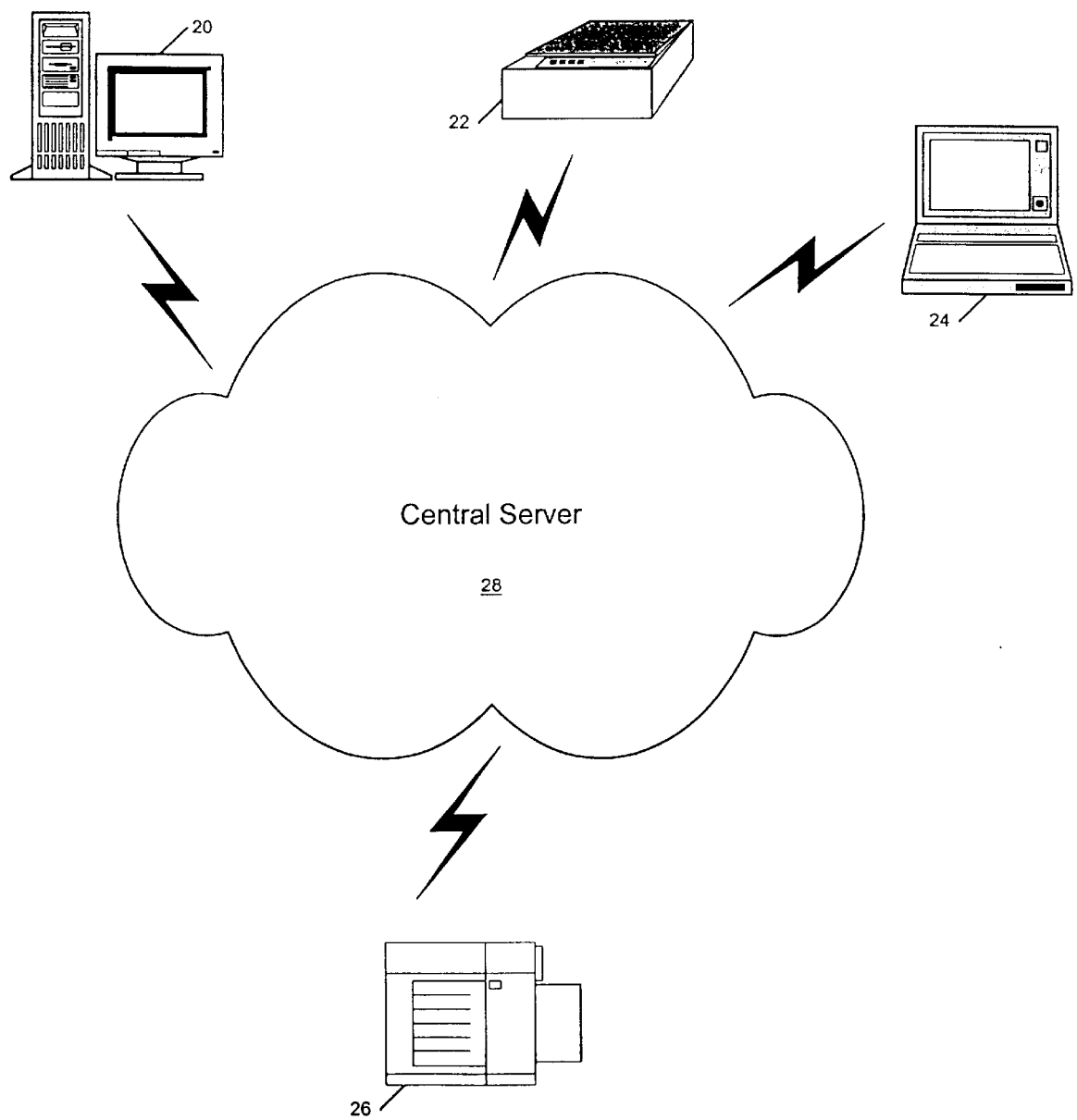
FIG. 2 illustrates a networked environment.
Figure 3:
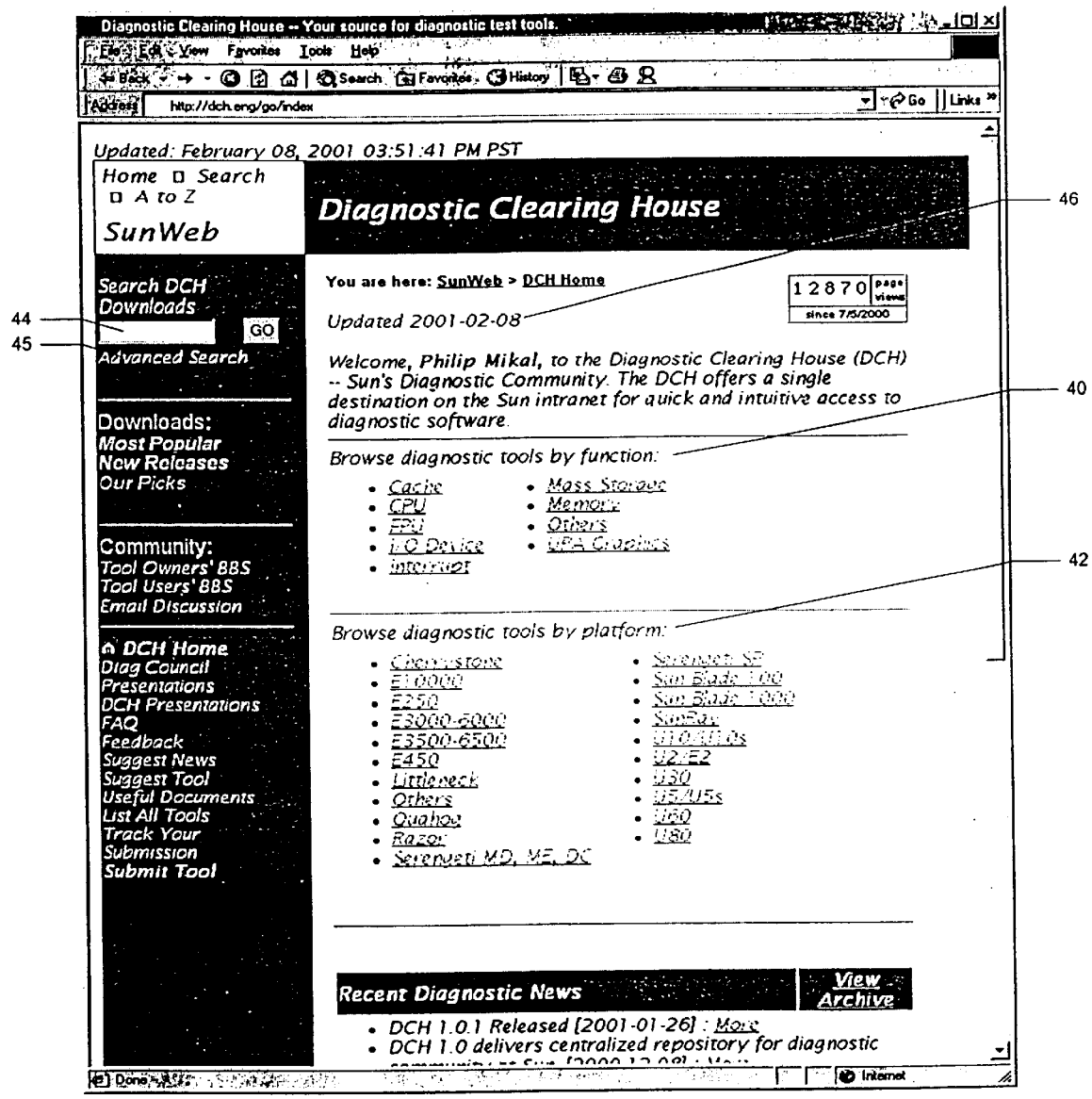
FIG. 3 illustrates a computer screen shot of Diagnostic Clearing House detailing diagnostic tool lists and searches in one embodiment of the invention.

Once the diagnostic tool is posted, the diagnostic tool can be searched, downloaded, and tracked. Referring to FIG. 3, diagnostic tools are searchable by a global keyword search engine (44) or by an advanced search engine (45) by a functional category, an operating system (not shown), or a platform (42). A search is made of the relational database and the diagnostic tools that meet the criteria set in the search are displayed on the DCH. Once the diagnostic tool sought by the tester is located, the tester is able to download the diagnostic tool. In one embodiment, up to five files (binary, text, etc.) plus one source file of the diagnostic tool may be downloaded from the relational database to a location designated by the tester. The tester can choose which of the files to download because downloading all of the available files may not be necessary. When the diagnostic tool is downloaded, the download of the diagnostic tool is recorded by the unique ID of the diagnostic tool in the relational database and a counter is incremented to allow tracking. Additionally, a tool history is recorded into a viewable log for each diagnostic tool based on the unique ID.

The communication vehicle section of the DCH allows a method for the DCH to interface and exchange information with other testers and tool owners. The DCH user is able to provide input to the content of the DCH by voting on the quality of a specific diagnostic tool (e.g., on a 1–5 star basis, with 5 star being the best), submitting news items, suggesting a specific diagnostic tool that is needed, providing user comments on a specific tool, submitting the addition of categories for diagnostic tool classification, suggesting FAQs or alternative answers to FAQs, and participating in an electronic bulletin board discussion. In one embodiment of this invention, the DCH administrator is allowed to notify all DCH users that have previously downloaded a specific diagnostic tool. This notification would be useful, for example, in cases where a critical bug is found in the diagnostic tool and notification of all DCH users using the diagnostic tool is necessary.

Figure 5:
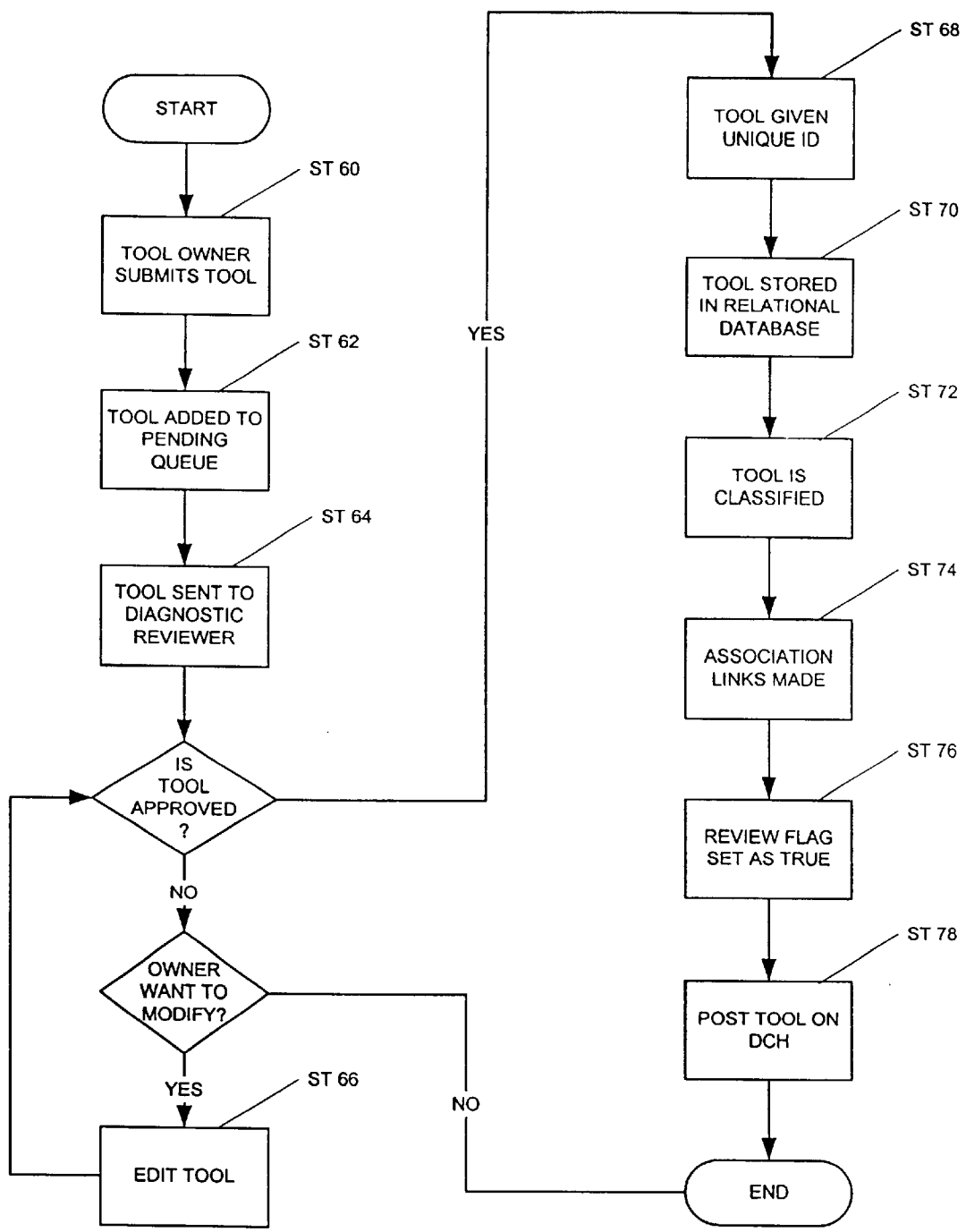
FIG. 5 illustrates a flowchart of the process to submit and post diagnostic tools onto the Diagnostic Clearing House in one embodiment of the invention.

The administration section as shown in FIG. 4 controls the logistics and content of the DCH. Managing the process of diagnostic tool submission and posting is automated. As shown in FIG. 5, from an administration perspective, the tool owner submits the diagnostic tool (step 60) and then the diagnostic tool is put into an administration pending queue (step 62). A DCH administrator then passes the information about the diagnostic tool and the diagnostic tool itself to the Diagnostic Reviewer for approval (step 64). During the approval process, the diagnostic tool may be edited and re-submitted (step 66). Once approved, the diagnostic tool is then given a unique ID (step 68) and stored in a relational database that is accessed by the DCH (step 70). The diagnostic tool is classified as to the functional category, operating system, and platform (step 72). Association links are made between existing diagnostic tools that are related to the submitted diagnostic tool (step 74). A written description of the diagnostic tool that is displayed on the DCH has a review flag set as true that the tool requires review by a technical writer (step 76) (once reviewed, the review flag is set to false by the technical writer). Upon completion of these steps, the diagnostic tool is then posted on the DCH by the DCH administrator (step 78) with the date added also displayed on the DCH.

During the entire submission and posting process, the tool owner can track the status of the pending diagnostic tool submission and is notified by the DCH administrator, typically by e-mail, when the diagnostic tool is posted and how the diagnostic tool is classified.

Once the diagnostic tool is posted and the tool owner chooses to edit, modify, or upgrade the diagnostic tool, the process starts again as if a new diagnostic tool is submitted, except that the same unique ID is used.

Once the diagnostic tool is posted, the DCH administrator is able to edit the diagnostic tool, delete the diagnostic tool, add the diagnostic tool to an "Our Pick" category, and delete the diagnostic tool from the "Our Pick" category.

Managing user access to the DCH is also automated in the DCH. A welcome screen to the DCH displays a link to initiate a log in procedure for registered DCH users and a link to register a new DCH user. If the DCH user is registered, the log in procedure requests a user name and password. Access to the DCH is allowed once the DCH user enters an assigned user name and password. If the DCH user is not registered, the DCH user chooses the link to register a new DCH user. Next, an access request is automatically generated and put into an access request queue. The request is reviewed for authentication by validating the request against a corporate database and directories. Upon approval, the new DCH user is sent, typically by e-mail, an assigned user name and password. A proper alias for each DCH user with proper contact information exists after the registration process enabling testers and test owners to communicate freely.

DCH users are assigned different levels of access based upon his or her needs. The default level of access is a test user status. This status level allows a DCH user to access all of the DCH except the source code of the diagnostic tools and the administrative functions. A test owner status is conferred the same status as test user status except that the test owner status is allowed to view the source code of his or her diagnostic tools and is able to track the status of his or her diagnostic tool submissions. An administrator status has access to all areas of the DCH.

Figure 6:
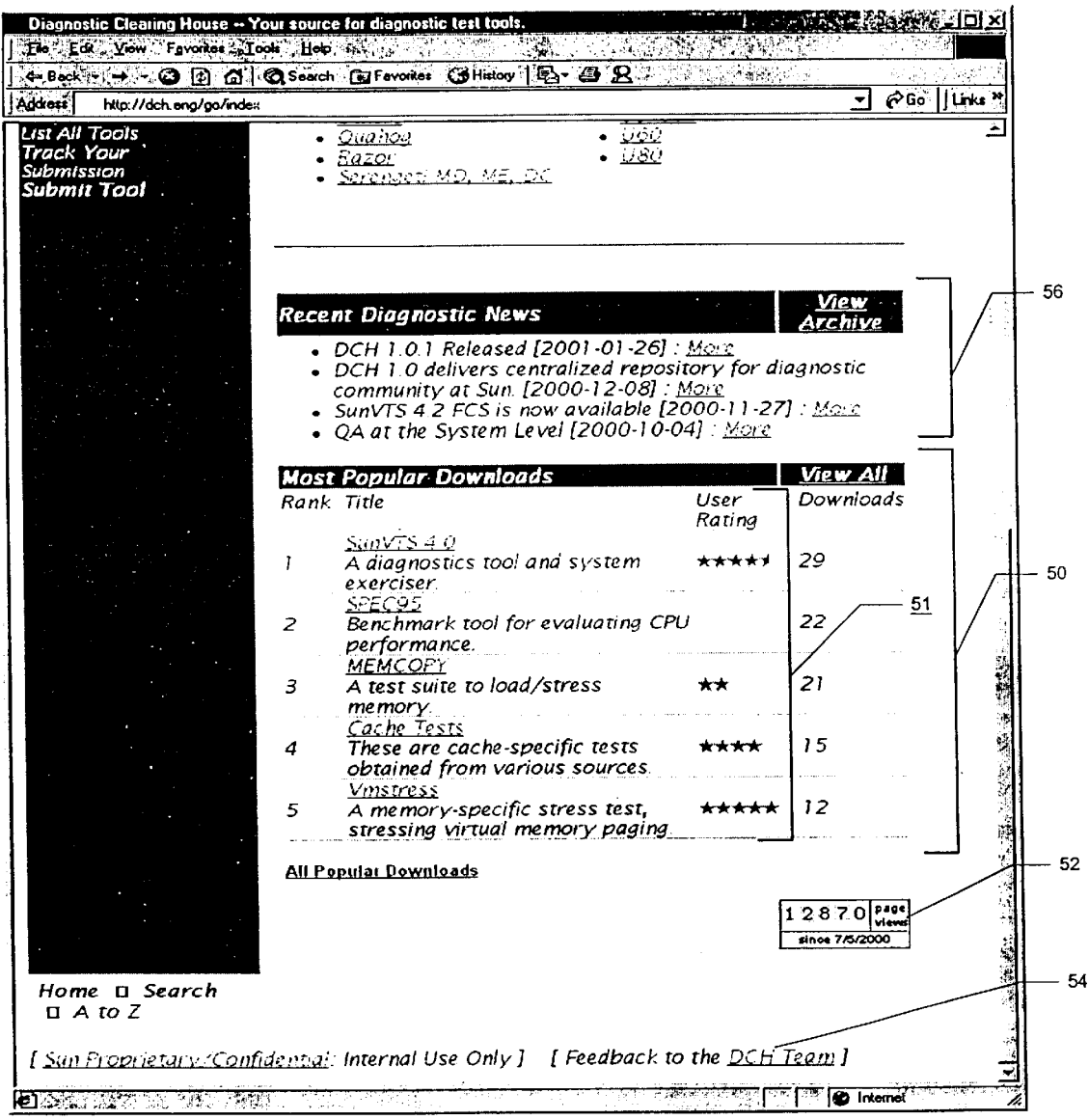
FIG. 6 illustrates a computer screen shot of Diagnostic Clearing House detailing diagnostic information and most popular downloads listing House in one embodiment of the invention.

The graphical and textual content of the DCH is managed by the DCH administrator. When the FAQ or an alternative answer to the FAQ is submitted by the DCH user, the DCH administrator reviews the question or answer to determine if acceptable and then posts an acceptable FAQ and an appropriate answer onto the DCH. The DCH administrator may also unilaterally post FAQs with appropriate answers onto the DCH. When a new item is submitted by a DCH user, the DCH administrator reviews the news item to determine if acceptable and then posts the acceptable news item onto the DCH (56) as shown in FIG. 6. The DCH administrator may also unilaterally post the business entity's publication relations news, product release information, or other current event of note about the diagnostic community onto the DCH. When the functional category or platform suggestion for the diagnostic tool is submitted by the DCH user, the DCH administrator determines if the suggestion is a proper category or platform. If proper, the category or platform is added to the DCH. The DCH administrator also monitors the activity within the electronic bulletin board discussion and can delete or add comments, as needed.

The DCH administrator also controls listing diagnostic tools by various factors as shown in FIG. 3 and FIG. 6. In one embodiment of the invention, diagnostic tools are listed by the most recently added diagnostic tools, the most popular diagnostic tools (50 in FIG. 6) (rated by the number of downloads of that diagnostic tool), the functional category (40 in FIG. 3) or platform (42 in FIG. 3) of the diagnostic tools, and by user ratings of the diagnostic tools (51 in FIG. 6). The most recently added diagnostic tools list is accomplished by displacing the titles of the tools currently on the list down one spot each and then adding the title of the new tool to the first spot in the list when the tool is added. The most popular tool list is accomplished by displaying a ranked list from the largest to the smallest number of diagnostic tools based on the number in the incremental counter that is increased with each download of the diagnostic tool. The listing of the category or platform of the diagnostic tool is accomplished by displaying the diagnostic tool with the category, platform, or operating system assigned to the diagnostic tool when posted onto the DCH by the DCH administrator. The listing by user rating of the diagnostic tool is accomplished by displaying the average of the user ratings submitted by DCH users next to the title of the diagnostic tool. If no ratings have been submitted, the diagnostic tool is treated as being rated as zero.

Other tasks handled automatically in administration section of the DCH include incrementing the page view counter (52 in FIG. 6) when a DCH user logs onto the DCH, supplying the last update date to the DCH (46 in FIG. 3), and allowing e-mail feedback from DCH users (54 in FIG. 6).

In one embodiment, an enhancement of the DCH includes linking diagnostic tools by versions and branching of diagnostic tools by type over time (providing a family tree of the diagnostic tool). In one embodiment, an enhancement of the DCH is personalization of the DCH to notify the DCH user of an update or new version of the diagnostic tool that the DCH user downloaded in the past.

Generally, the DCH provides information regarding all available diagnostic tools to DCH users via an easy access method using category or keyword searching. Information on the latest diagnostic tool, diagnostic tool coverage, product news, and design roadmaps is found on the DCH. In addition, a method to interface with other testers and diagnostic tool developers exists. Accordingly, several advantages of the DCH include a tester saving at least three hours of time per download by being able to identify and learn about the proper diagnostic tool rapidly and efficiently. Also, tool owners can save at least one week of work time by leveraging the diagnostic tool source code, when available, to avoid coverage overlaps and increase the quality and depth of tests.

Specifically, the DCH improves the quality of hardware products, eliminate overlap of test coverage development, and shorten the development cycle. The DCH promotes consistent usage of quality diagnostic tools while identifying test holes and recommending diagnostic tool investment. The DCH creates and promotes a diagnostic tester and test owner community and as part of this community, keeps testers and tool owners informed of the latest diagnostic tools, activities, and product news.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A diagnostic clearing house, comprising:
    a tool repository to store a plurality of diagnostic tools;
    a communication vehicle to allow a plurality of diagnostic tool users to exchange diagnostic information; and
    a management system to manage access to and content of the tool repository and the communication vehicle and to manage distribution of diagnostic tools from the tool repository to an end user;
    wherein the plurality of diagnostic tools comprise a diagnostic tool designed for testing computer hardware components.

2. The apparatus of claim 1, wherein the diagnostic clearing house is web-based.

3. The apparatus of claim 1, wherein the tool repository is a relational database.

4. The apparatus of claim 1, wherein the distribution of diagnostic tools is by computer download.

5. The apparatus of claim 1, wherein the diagnostic information comprises reviews of diagnostic tools.

6. The apparatus of claim 1, wherein the diagnostic information comprises suggestions of additional classification categories.

7. The apparatus of claim 1, wherein the diagnostic information comprises electronic bulletin board discussions.

8. A method of using a diagnostic clearing house, comprising:
    locating a diagnostic tool by searching a tool repository;
    distributing the diagnostic tool to a user from the tool repository; and
    exchanging diagnostic information concerning the diagnostic tool between a plurality of users;
    wherein the diagnostic tool is designed for testing computer hardware components.

9. The method of claim 8, further comprising: submitting the diagnostic tool to the tool repository.

10. The method of claim 8, wherein the diagnostic clearing house is web-based.

11. The method of claim 8, wherein the tool repository is a relational database.

12. The method of claim 8, wherein distributing the diagnostic tool is by computer download.

13. A method of submitting and posting a diagnostic tool in a diagnostic clearing house, comprising:
    submitting the diagnostic tool by the tool owner to the diagnostic clearing house;
    adding the diagnostic tool to a pending queue;
    using an administrator to remove the diagnostic tool from the pending queue and send the diagnostic tool to a diagnostic council;
    approving the diagnostic tool by the diagnostic council;
    assigning the diagnostic tool a unique id;
    storing the diagnostic tool in a tool repository based on the unique id;
    classifying the diagnostic tool;
    associating the diagnostic tool by links with related diagnostic tools in the tool repository; and
    posting the diagnostic tool on the diagnostic clearing house;
    wherein the diagnostic tool is designed for testing computer hardware components.

14. The method of claim 13, further comprising:
    setting a review flag as true.

15. The method of claim 13, wherein the diagnostic clearing house is web-based.

16. The method of claim 13, wherein the tool repository comprises a relational database.

17. A method of exchanging diagnostic information between a plurality of diagnostic tool users in a diagnostic clearing house, comprising:
    adding diagnostic information from a diagnostic tool user to a pending queue;
    removing the diagnostic information from the pending queue by an administrator;
    sending the diagnostic information to a diagnostic reviewer by the administrator;
    approving the diagnostic information by the diagnostic reviewer; and
    posting the diagnostic information on the diagnostic clearing house;
    wherein the diagnostic tool is designed for testing computer hardware components.

18. The method of claim 17, wherein the diagnostic clearing house is web-based.

19. A computer system for a diagnostic clearing house, comprising:
    a storage element comprising a relational database;
    a plurality of diagnostic tools stored in the relational database;
    a processor for distributing a plurality of diagnostic tools from the relational database in the storage element; and
    a communication vehicle stored in the relational database in the storage element for allowing a plurality of users to exchange diagnostic information;
    wherein the diagnostic tool is designed for testing computer hardware components.

20. The system of claim 19, further comprising:
    a computer monitor adapted to display the diagnostic clearing house.

21. The system of claim 19, wherein the diagnostic clearing house is web-based.

22. A diagnostic clearing house, comprising:
    means for accessing a diagnostic tool by searching a tool repository;
    means for distributing the diagnostic tool to a user from the tool repository;
    means for exchanging diagnostic information between a plurality of users;

means for submitting the diagnostic tool to the tool repository; and means for posting the diagnostic tool on the diagnostic clearing house;

wherein the diagnostic tool is designed for testing computer hardware components.

* * * * *